(12) United States Patent
Lee et al.

(10) Patent No.: US 12,239,169 B2
(45) Date of Patent: Mar. 4, 2025

(54) AEROSOL GENERATING DEVICE

(71) Applicant: KT&G CORPORATION, Daejeon (KR)

(72) Inventors: Won Kyeong Lee, Gyeonggi-do (KR); Min Kyu Kim, Daejeon (KR); Jong Sub Lee, Gyeonggi-do (KR); Byung Sung Cho, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 873 days.

(21) Appl. No.: 17/293,269

(22) PCT Filed: Dec. 14, 2020

(86) PCT No.: PCT/KR2020/018254
§ 371 (c)(1),
(2) Date: May 12, 2021

(87) PCT Pub. No.: WO2021/157846
PCT Pub. Date: Aug. 12, 2021

(65) Prior Publication Data
US 2022/0395028 A1    Dec. 15, 2022

(30) Foreign Application Priority Data
Feb. 7, 2020  (KR) .................. 10-2020-0015165

(51) Int. Cl.
*A24F 40/57*    (2020.01)
*A24F 40/10*    (2020.01)
(Continued)

(52) U.S. Cl.
CPC .............. *A24F 40/57* (2020.01); *A24F 40/10* (2020.01); *A24F 40/51* (2020.01); *G05B 11/28* (2013.01); *G05D 23/20* (2013.01); *H05B 1/0244* (2013.01)

(58) Field of Classification Search
CPC ........ H05B 1/0244; A24F 40/57; A24F 40/51; A24F 40/10; A24F 40/50
See application file for complete search history.

(56) References Cited

U.S. PATENT DOCUMENTS 9,067,029 B2    6/2015    Yamada et al.
9,532,600 B2    1/2017    Thorens et al.
(Continued)

FOREIGN PATENT DOCUMENTS

CN    110520003 A    11/2019
EP    3222159 A1    9/2017
(Continued)

OTHER PUBLICATIONS

Office Action issued Apr. 20, 2023 in Chinese Application No. 202080007382.4.

(Continued)

*Primary Examiner* — Thien S Tran
(74) *Attorney, Agent, or Firm* — Sughrue Mion, PLLC

(57) ABSTRACT

An aerosol generating device includes: a cartridge including a liquid storage and an atomizer; and a main body including a battery, a puff sensor, and a controller configured to perform pulse width modulation (PWM) control for supplying power from the battery to the atomizer, wherein the controller performs the PWM control at a first duty ratio during a puff period and performs the PWM control at a second duty ratio lower than the first duty ratio during a non-puff period between puff periods.

12 Claims, 12 Drawing Sheets

(51) Int. Cl.
    *A24F 40/51*      (2020.01)
    *G05B 11/28*      (2006.01)
    *G05D 23/20*      (2006.01)
    *H05B 1/02*      (2006.01)

(56) References Cited

U.S. PATENT DOCUMENTS

| | | | |
|---|---|---|---|
| 9,949,507 | B2 | 4/2018 | Flick |
| 10,433,589 | B2 | 10/2019 | Zitzke et al. |
| 10,537,135 | B2 | 1/2020 | Smith et al. |
| 11,596,182 | B2 | 3/2023 | Lee et al. |
| 2013/0340750 | A1 | 12/2013 | Thorens et al. |
| 2014/0299141 | A1* | 10/2014 | Flick .................. H05B 1/0202 219/494 |
| 2014/0321837 | A1 | 10/2014 | Flick |
| 2016/0205998 | A1* | 7/2016 | Matsumoto ............. A24F 40/50 |
| 2017/0135404 | A1 | 5/2017 | Reevell |
| 2017/0238596 | A1 | 8/2017 | Matsumoto et al. |
| 2018/0116292 | A1* | 5/2018 | Atkins .................. A24F 40/46 |
| 2018/0325182 | A1* | 11/2018 | Zitzke .................. H05B 1/0297 |
| 2019/0373679 | A1 | 12/2019 | Fu et al. |
| 2020/0154773 | A1 | 5/2020 | Lim et al. |
| 2021/0052829 | A1* | 2/2021 | Dignum ............... A61M 11/042 |
| 2021/0068456 | A1 | 3/2021 | Bessant et al. |
| 2021/0145069 | A1 | 5/2021 | Mizuguchi et al. |
| 2021/0145073 | A1 | 5/2021 | Lee et al. |

FOREIGN PATENT DOCUMENTS

| | | | | |
|---|---|---|---|---|
| JP | 2014-530632 | A | | 11/2014 |
| KR | 10-2009-0023742 | A | | 3/2009 |
| KR | 10-1922737 | B1 | | 11/2018 |
| KR | 10-2019-0035478 | A | | 4/2019 |
| KR | 10-2019-0070940 | A | | 6/2019 |
| WO | 2012/109371 | A2 | | 8/2012 |
| WO | 2019/066228 | A1 | | 4/2019 |
| WO | WO-2019141577 | A1 | * | 7/2019 ............ A24F 40/42 |
| WO | 2020/009457 | A1 | | 1/2020 |
| WO | 2020/026288 | A1 | | 2/2020 |

OTHER PUBLICATIONS

Office Action issued Mar. 14, 2023 in Japanese Application No. 2021-539070.
Extended European Search Report issued Dec. 21, 2021 in European Application No. 20880344.5.
Office Action issued Aug. 30, 2022 in Japanese Application No. 2021-539070.
International Search Report for PCT/KR2020/018254 dated, Mar. 23, 2021 (PCT/ISA/210).
Written Opinion of the International Searching Authority for PCT/KR2020/018254 dated, Mar. 23, 2021 (PCT/ISA/237).

* cited by examiner

AEROSOL GENERATING DEVICE

TECHNICAL FIELD

One or more embodiments relate to an aerosol generating device, and more particularly, to an aerosol generating device for performing pulse width modulation (PWM) control for controlling power supply to a heater during a non-puff period between puff periods.

BACKGROUND ART

Recently, the demand for alternatives to traditional cigarettes has increased. For example, there is growing demand for an aerosol generating device that generates aerosols by heating an aerosol generating material in cigarettes, rather than by combusting cigarettes. Accordingly, studies on a heating-type cigarette and a heating-type aerosol generating device have been actively conducted.

DISCLOSURE OF INVENTION

Technical Problem

One or more embodiments include an aerosol generating device for preventing an excessive decrease in temperature of a heater by performing PWM control for continuously supplying power to the heater during a non-puff period. The technical problems to be solved by one or more embodiments are not limited to the technical problems as described above, and other technical problems may be inferred from the following embodiments.

Solution to Problem

According to one or more embodiments, an aerosol generating device includes: a cartridge including a liquid storage configured to store a liquid aerosol generating material, and an atomizer configured to generate an aerosol by heating the liquid aerosol generating material; and a main body detachably coupled to the cartridge, and including: a battery configured to supply power to the atomizer; a puff sensor configured to detect a start time and an end time of a puff of a user; and a controller configured to: perform a pulse width modulation (PWM) control at a first duty ratio between a start time and an end time of a current puff such that a heater of the atomizer is heated to a target temperature range for generating the aerosol, and performs the PWM control at a second duty ratio lower than the first duty ratio between the end time of the current puff and a start time of a next puff.

Advantageous Effects of Invention

According to one or more embodiments, a uniform and sufficient amount of aerosol may be provided to a user during each puff by performing temperature control of a heater through PWM control not only during a puff period but also during a non-puff period, thereby improving a smoking sensation of the user.

BEST MODE FOR CARRYING OUT THE INVENTION

Figure 1:
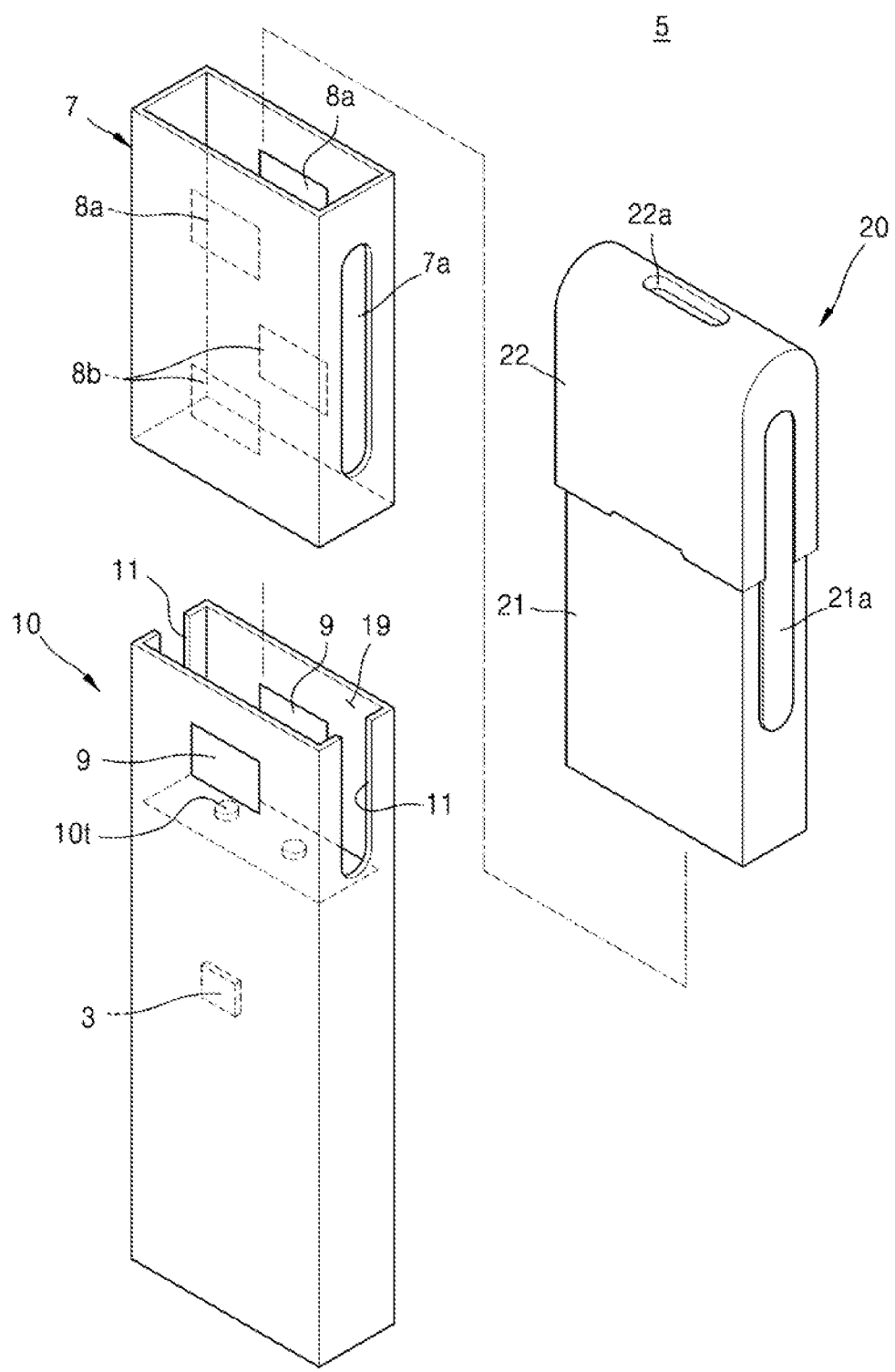
FIG. 1 is an exploded perspective view schematically illustrating a coupling relationship between a replaceable cartridge containing an aerosol generating material and an aerosol generating device including the same, according to an embodiment.

According to one or embodiments, an aerosol generating device includes: a cartridge including a liquid storage configured to store a liquid aerosol generating material, and an atomizer configured to generate an aerosol by heating the liquid aerosol generating material; and a main body detachably coupled to the cartridge, and including: a battery configured to supply power to the atomizer; a puff sensor configured to detect a start time and an end time of a puff of a user; and a controller configured to: perform a pulse width modulation (PWM) control at a first duty ratio between a start time and an end time of a current puff such that a heater of the atomizer is heated to a target temperature range for generating the aerosol, and performs the PWM control at a second duty ratio lower than the first duty ratio between the end time of the current puff and a start time of a next puff.

The controller may perform the PWM control at the second duty ratio such that a temperature of the heater is maintained within a predetermined temperature range, which is lower than the target temperature range.

The atomizer may include a wick surrounded by the heater and configured to absorb and transfer the liquid aerosol generating material, and the liquid aerosol generating material absorbed in the wick is not vaporized while the heater is in the predetermined temperature range.

A first period for the PWM control at the first duty ratio may be longer than a second period for the PWM control at the second duty ratio.

The controller may set the second duty ratio such that a difference between an amount of aerosol generated during the current puff and an amount of aerosol generated during the next puff is within a predetermined range.

The controller may end the PWM control at the second duty ratio based on an accumulated number of puffs reaching a predetermined maximum number of puffs.

The controller may end the PWM control at the second duty ratio when a predetermined time has elapsed before the start time of the next puff.

The second duty ratio may be 30%.

According to one or more embodiments, an aerosol generating device includes: an atomizer configured to heat a liquid aerosol generating material; a battery configured to supply power to the atomizer; a puff sensor configured to detect a start time and an end time of a puff of a user; and a controller configured to control power supplied to the atomizer by performing pulse width modulation (PWM) control based on the start time and the end time of the puff such that a temperature of a heater of the atomizer is maintained within a predetermined temperature range, which is lower than a target temperature range for generating an aerosol, during a non-puff period between puff periods.

The controller may perform the PWM control at a first duty ratio between a start time and an end time of a current puff such that the heater of the atomizer is heated to the target temperature range, and perform the PWM control at a second duty ratio between the end time of the current puff and a start time of a next puff.

The second duty ratio may be lower than the first duty ratio, and a first period for the PWM control at the first duty ratio may be longer than a second period for the PWM control at the second duty ratio.

According to one or more embodiments, a method for controlling an aerosol generating device includes: detecting a start time of a puff of a user by using a puff sensor; after the detected start time, controlling power supplied from a battery to a atomizer by performing pulse width modulation (PWM) control at a first duty ratio such that a heater of the atomizer is heated to a target temperature range for generating an aerosol from a liquid aerosol generating material; detecting an end time of the puff; and after the detected end time, controlling power supplied to the atomizer by performing the PWM control at a second duty ratio lower than the first duty ratio until a start time of a next puff is detected.

The PWM control at the second duty ratio maintains a temperature of the heater within a predetermined temperature range, which is lower than the target temperature range, during a non-puff period between puff periods.

A first period for the PWM control at the first duty ratio may be longer than a second period for the PWM control at the second duty ratio.

The controller may adaptively change the second duty ratio on the basis of a remaining capacity of the battery.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 is inserted into an accommodation space 19 of the main body 10 so that the cartridge 20 may be mounted on the main body 10. The cartridge 20 may be detachable from the main body 10.

The cartridge 20 may contain an aerosol generating material in any one of, for example, a liquid state, a solid state, a gaseous state, or a gel state. The aerosol generating material may be a liquid aerosol generating material formed of a liquid composition. For example, the liquid composition may be a liquid including a tobacco-containing material, a liquid having a volatile tobacco flavor component, and/or a liquid including a non-tobacco material.

For example, the liquid composition may include glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight relative to the total solution weight of the liquid composition such that a proper nicotine concentration is obtained.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 20 is operated by an electrical signal or a wireless signal transmitted from the main body 10 to perform a function of generating an aerosol by converting the phase of the aerosol generating material inside the cartridge 20 to a gaseous phase. The aerosol may refer to a gas in which vaporized particles generated from an aerosol generating material are mixed with air.

For example, the cartridge 20 may convert the phase of the aerosol generating material by receiving the electrical signal from the main body 10 and heating the aerosol generating material, or by using an ultrasonic vibration method, or by using an induction heating method. As another example, when the cartridge 20 includes its own power source, the cartridge 20 may generate aerosol by being operated by an electric control signal or a wireless signal transmitted from the main body 10 to the cartridge 20.

The cartridge 20 may include a liquid storage 21 accommodating a liquid aerosol generating material therein, and an atomizer performing a function of converting the liquid aerosol generating material of the liquid storage 21 to aerosol.

When the liquid storage 21 "accommodates the liquid aerosol generating material" therein, it means that the liquid storage 21 functions as a container simply holding an liquid aerosol generating material and that the liquid storage 21 includes therein an element including an liquid aerosol generating material, such as a sponge, cotton, fabric, or porous ceramic structure.

The atomizer may include, for example, a liquid delivery element (e.g., a wick) for absorbing the liquid aerosol generating material and transferring the liquid aerosol generating material in an optimal state for converting the liquid aerosol generating material into an aerosol, and a heater for generating an aerosol by heating the liquid delivery element to vaporize the liquid aerosol generating material absorbed by the liquid delivery element.

The liquid delivery element may include at least one of, for example, a cotton fiber, a ceramic fiber, a glass fiber, and porous ceramic.

The heater may include a metallic material such as copper, nickel, tungsten, or the like to heat the liquid aerosol generating material delivered to the liquid delivery element by generating heat using electrical resistance. The heater may be implemented by, for example, a metal wire, a metal plate, a ceramic heating element, or the like, and may be implemented by a conductive filament, a coil heater wound on the liquid delivery element, or arranged adjacent to the liquid delivery element, by using a material such as a nichrome wire.

In addition, the atomizer may be implemented by a heating element in the form of a mesh or plate, which performs both the functions of absorbing the aerosol generating material and maintaining the same in an optimal state for conversion to aerosol without using a separate liquid delivery element and the function of generating aerosol by heating the aerosol generating material.

At least a portion of the liquid storage 21 of the cartridge 20 may include a transparent material so that the liquid aerosol generating material accommodated in the cartridge 20 may be visually identified from the outside. The liquid storage 21 includes a protruding window 21a protruding from the liquid storage 21, so that the liquid storage 21 may be inserted into a groove 11 of the main body 10 when coupled to the main body 10. A mouthpiece 22 and the liquid storage 21 may be entirely formed of transparent plastic or glass. Alternatively, only the protruding window 21a corresponding to a portion of the liquid storage 21 may be formed of a transparent material.

The main body 10 includes a connection terminal 10t arranged in the accommodation space 19. When the liquid storage 21 of the cartridge 20 is inserted into the accommodation space 19 of the main body 10, the main body 10 may provide power and a signal related to an operation of the cartridge 20 to the cartridge 20 through the connection terminal 10t.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22a for discharging aerosol generated from the aerosol generating material inside the liquid storage 21 to the outside.

The slider 7 is coupled to the main body 10 to move with respect to the main body 10. The slider 7 covers at least a portion of the mouthpiece 22 of the cartridge 20 coupled to the main body 10 or exposes at least a portion of the mouthpiece 22 to the outside by moving with respect to the main body 10. The slider 7 includes an elongated hole 7a exposing at least a portion of the protruding window 21a of the cartridge 20 to the outside.

The slider 7 has a container shape including a hollow space opened to both ends. The structure of the slider 7 is not limited to the container shape as shown in the drawings, and the slider 7 may have a bent plate structure having a clip-shaped cross-section, which is movable with respect to the main body 10 while being coupled to an edge of the main body 10, or a structure having a curved semi-cylindrical shape and a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8a facing each other with an inner space of the slider 7 in between, and two second magnetic bodies 8b facing each other with the inner space of the slider 7 in between. The first magnetic bodies 8a and the second magnetic bodies 8b are arranged to be spaced apart from each other along a longitudinal direction of the main body 10, which is a moving direction of the slider 7, that is, the direction in which the main body 10 extends.

The main body 10 includes a fixed magnetic body 9 arranged on a path along which the first magnetic bodies 8a and the second magnetic bodies 8b of the slider 7 move while the slider 7 moves with respect to the main body 10.

Two fixed magnetic bodies 9 of the main body 10 may be mounted to face each other with the accommodation space 19 in between.

Depending on the position of the slider 7, the slider 7 may be stably maintained in a position where an end of the mouthpiece 22 is covered or exposed by a magnetic force acting between the fixed magnetic body 9 and the first magnetic body 8a or between the fixed magnetic body 9 and the second magnetic body 8b.

The main body 10 includes a position change detecting sensor 3 arranged on the path along which the first magnetic body 8a and the second magnetic body 8b of the slider 7 move while the slider 7 moves with respect to the main body 10. The position change detecting sensor 3 may include, for example, a Hall sensor (i.e., Hall IC) using the Hall effect that detects a change in a magnetic field and generates a signal.

In the aerosol generating device 5 according to the above-described embodiments, the main body 10, the cartridge 20, and the slider 7 have approximately rectangular cross-sectional shapes in a direction transverse to the longitudinal direction, but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly when extending in the longitudinal direction, and may extend a long way while being curved in a streamlined shape or bent at a preset angle in a specific area to be easily held by the user.

Figure 2:
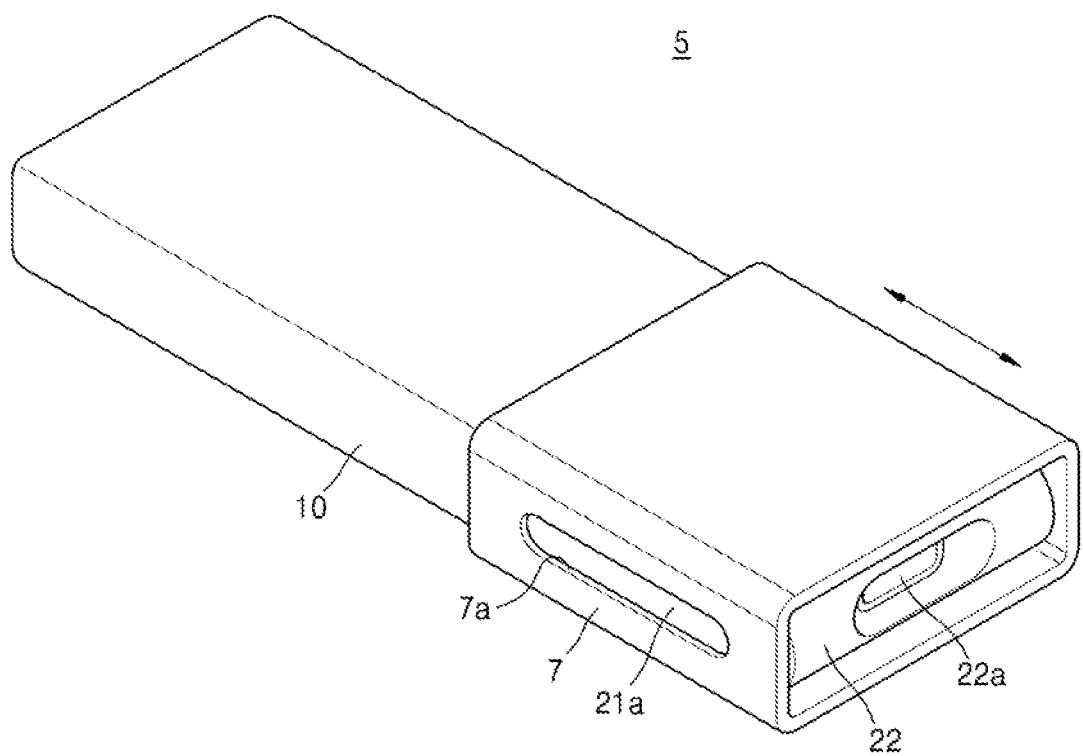
FIG. 2 is a perspective view of an exemplary operating state of the aerosol generating device according to the embodiment illustrated in FIG. 1.

FIG. 2 is a perspective view of an exemplary operating state of the aerosol generating device according to the embodiment illustrated in FIG. 1.

In FIG. 2, the operating state is shown in which the slider 7 is moved to a position where the end of the mouthpiece 22 of the cartridge 20 coupled to the main body 10 is covered. In a state where the slider 7 is moved to the position where the end of the mouthpiece 22 is covered, the mouthpiece 22 may be safely protected from external impurities and kept clean.

The user may check the remaining amount of aerosol generating material contained in the cartridge 20 by visually checking the protruding window 21a of the cartridge 20 through the elongated hole 7a of the slider 7. The user may move the slider 7 in the longitudinal direction of the main body 10 to use the aerosol generating device 5.

Figure 3:
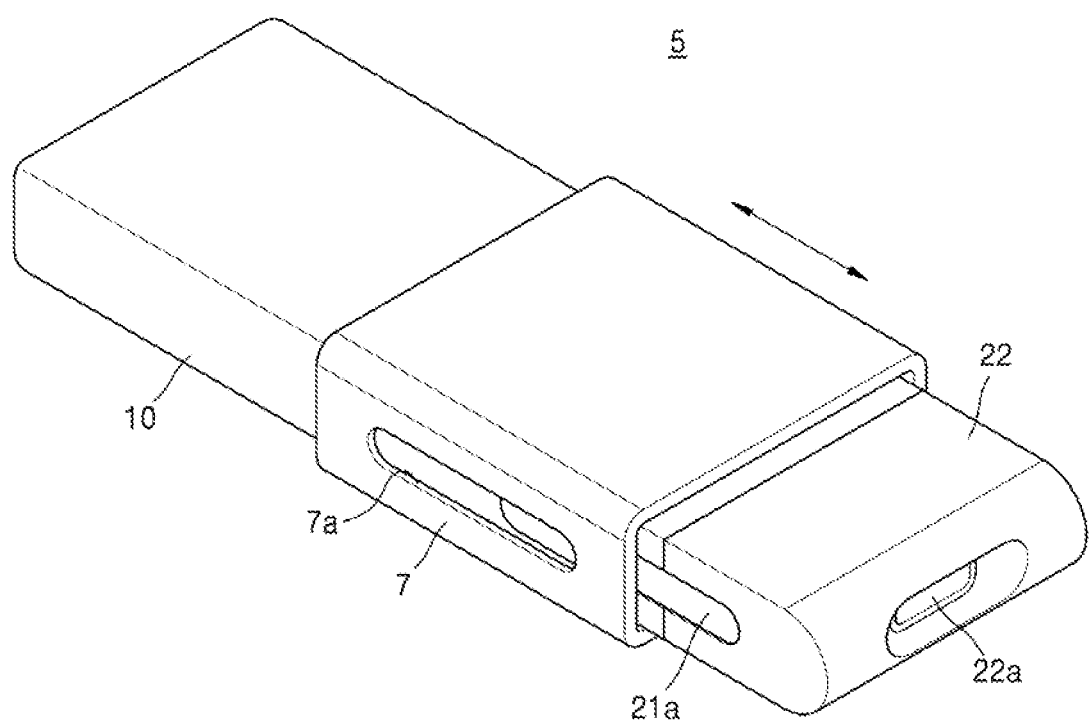
FIG. 3 is a perspective view of another exemplary operating state of the aerosol generating device according to the embodiment illustrated in FIG. 1.

FIG. 3 is a perspective view of another exemplary operating state of the aerosol generating device according to the embodiment illustrated in FIG. 1.

In FIG. 3, the operating state is shown in which the slider 7 is moved to a position where the end of the mouthpiece 22 of the cartridge 20 coupled to the main body 10 is exposed to the outside. In a state where the slider 7 is moved to the position where the end of the mouthpiece 22 is exposed to the outside, the user may insert the mouthpiece 22 into his or her mouth and absorb aerosol discharged through the discharge hole 22a of the mouthpiece 22.

Even when the slider 7 is moved to the position where the end of the mouthpiece 22 is exposed to the outside, the protruding window 21a of the cartridge 20 is exposed to the outside through the elongated hole 7a of the slider 7, and thus, the user may visually check the remaining amount of a liquid aerosol generating material contained in the cartridge 20.

Figure 4:
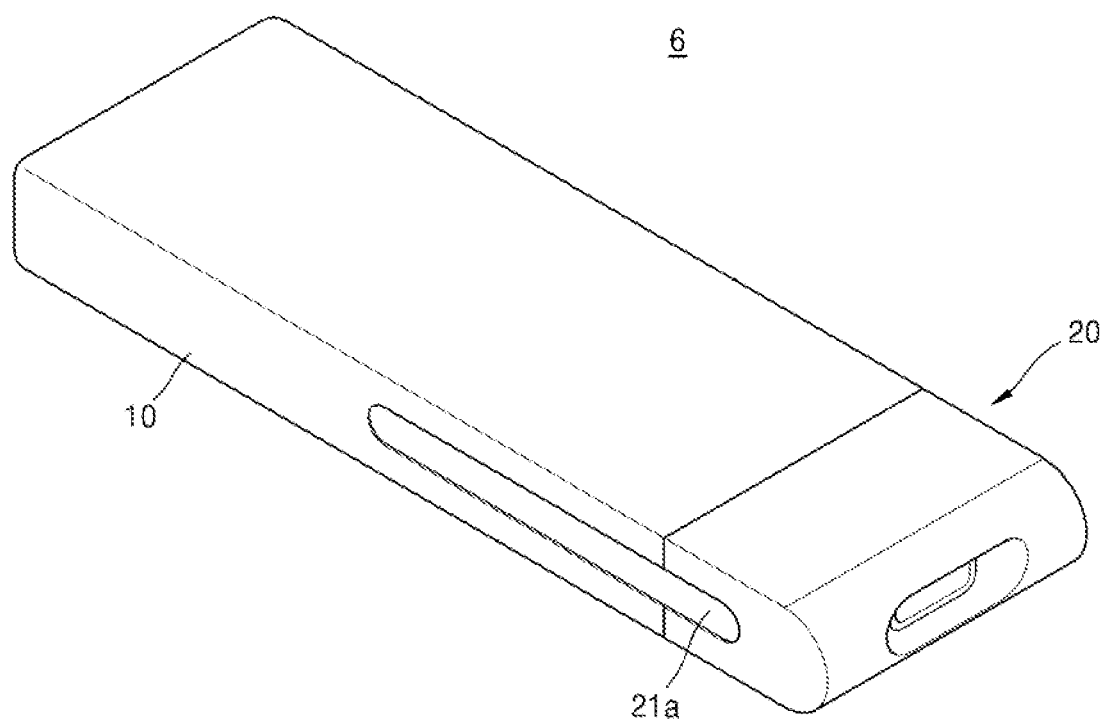
FIG. 4 is a view illustrating an aerosol generating device having a cartridge, according to another embodiment.

FIG. 4 is a view illustrating an aerosol generating device having a cartridge, according to another embodiment.

Referring to FIG. 4, unlike the aerosol generating device 5 described above with reference to FIGS. 1 through 3, the slider 7 is not provided. Therefore, the aerosol generating device 6 may include a cartridge 20 coupled to a main body 10 as described above. The coupling between the cartridge 20 and the main body 10 may be completed by inserting a protruding window 21a of the cartridge 20 into the main body 10.

Since the aerosol generating device 7 is not provided with the slider 7, the aerosol generating device 6 may not include components associated with the Hall IC such as the fixed magnetic body 9 and the position change detecting sensor 3 described above with reference to FIGS. 1 through 3. However, the aerosol generating device 6 may equally include components other than the components associated with the Hall IC.

The aerosol generating device 6 may turns on and off the aerosol generating device 6 by using an element such as a puff sensor. The puff sensor may detect an air flow inside the aerosol generating device 6. When the puff sensor detects an air flow exceeding a threshold value, the user's puff is considered to start, and thus, the aerosol generating device 6 may be turned on. The puff sensor may be preset to detect only an air flow in a particular direction but is not limited thereto.

In other words, instead of using the slider 7 to turn on and off the aerosol generating device 5 described in the embodiments of FIGS. 1 through 3, the aerosol generating device 6 may start operation according to the user's inhalation detected by the puff sensor. Therefore, the operation of the aerosol generating device 6 may start without a separate user's physical input (e.g., pushing a power button). The start of the operation of the aerosol generating device 6 may indicate that power is supplied from a battery to a heater.

An aerosol generating device to be described below may correspond to any aerosol generating device (5 or 6) in the embodiments described with reference to FIGS. 1 through 4.

Figure 5:
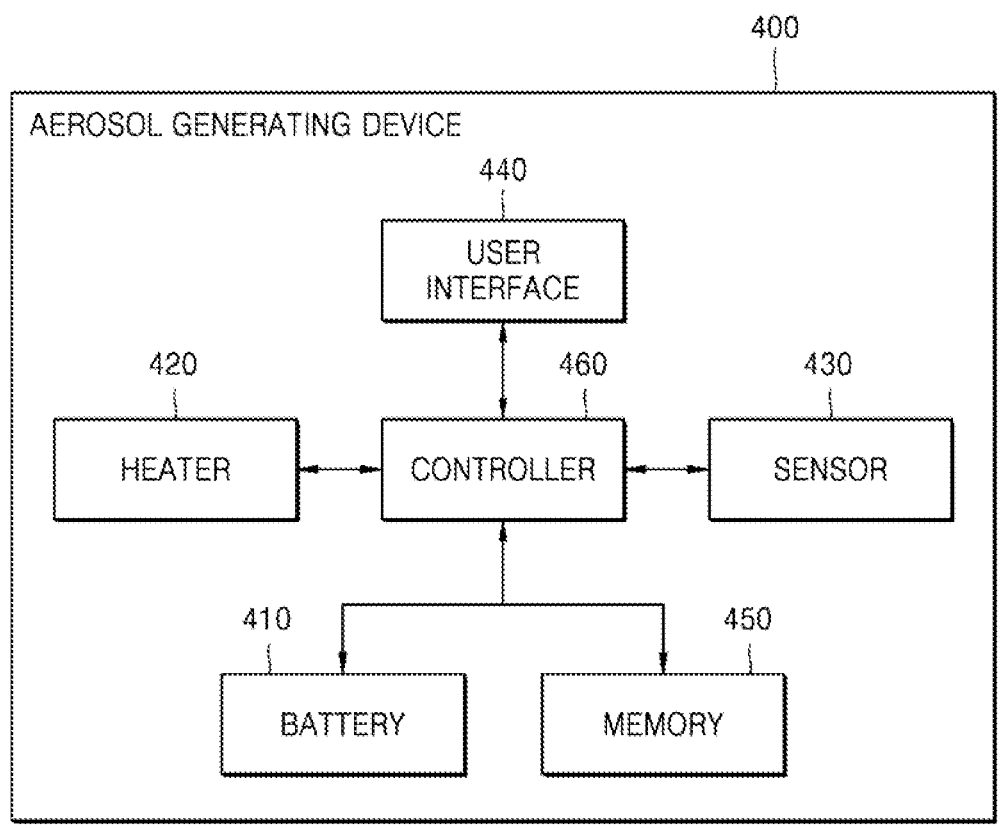
FIG. 5 is a block diagram illustrating hardware components of the aerosol generating device according to an exemplary embodiment.

FIG. 5 is a block diagram illustrating hardware components of the aerosol generating device according to an embodiment.

Referring to FIG. 5, the aerosol generating device 400 may include a battery 410, a heater 420, a sensor 430, a user interface 440, a memory 450, and a controller 460. However, the internal structure of the aerosol generating device 400 is not limited to the structures illustrated in FIG. 5. According to the design of the aerosol generating device 400, it will be understood by one of ordinary skill in the art that some of the hardware components shown in FIG. 5 may be omitted or new components may be added.

The aerosol generating device 400 of FIG. 5 may correspond to the aerosol generating device 5 described with reference to FIGS. 1 through 3 or may correspond to the aerosol generating device 6 described with reference to FIG. 4. However, the aerosol generating device 400 is not limited thereto, and may be a device having a different structure.

In one embodiment, the aerosol generating device 400 may include a main body and a cartridge, and hardware components of the aerosol generating device 400 may be located in the main body and/or the cartridge. In another embodiment, the aerosol generating device 400 may consist of a main body without a cartridge, in which case hardware components included in the aerosol generating device 400 are located in the main body.

Hereinafter, an operation of the components of the aerosol generating device 400 will be described without being limited to their locations.

The battery 410 supplies electric power to be used for the aerosol generating device 400 to operate. In other words, the battery 410 may supply power for the heater 420 to operate. In addition, the battery 410 may supply power required for operation of other hardware components included in the aerosol generating device 400, that is, the sensor 430, the user interface 440, the memory 450, and the controller 460. The battery 410 may be a rechargeable battery or a disposable battery. For example, the battery 410 may be a lithium polymer (LiPoly) battery, but is not limited thereto.

The heater 420 receives power from the battery 410 under the control of the controller 460. The heater 420 may receive power from the battery 410 and heat a cigarette inserted into the aerosol generating device 400, or heat the cartridge mounted on the aerosol generating device 400.

When the aerosol generating device 400 consists of the main body and the cartridge, the heater 420 may be located in the cartridge. In this case, the heater 420 may receive power from the battery 410 located in at least one of the main body and the cartridge. Alternatively, the heater 420 may be located in the main body of the aerosol generating device 400.

The heater 420 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 420 may be implemented by a metal wire, a metal plate on which an electrically conductive track is arranged, or a ceramic heating element, a coil, but is not limited thereto.

In an embodiment, the heater 420 may be a component included in the cartridge. The cartridge may include an atomizer including the heater 420 and a liquid delivery element, and a liquid storage. An aerosol generating material accommodated in the liquid storage of the atomizer may move to the liquid delivery element, and the heater 420 of the atomizer may generate an aerosol from a liquid aerosol generating material by heating the liquid aerosol generating material, which is absorbed into the liquid delivery element, by power supplied from the battery 410. For example, the heater 420 may be implemented as a coil heater, which includes a material such as nickel chrome and is wound around the liquid delivery element and may be adjacent to the liquid delivery element.

In another embodiment, the heater 420 may heat the cigarette inserted into the accommodation space of the aerosol generating device 400. As the cigarette is accommodated in the accommodation space of the aerosol generating device 400, the heater 420 may be located inside and/or outside the cigarette. Accordingly, the heater 420 may generate aerosol by heating the aerosol generating material in the cigarette.

Meanwhile, the heater 420 may include an induction heater. The heater 420 may include an electrically conductive coil for heating a cigarette or the cartridge by an induction heating method, and the cigarette or the cartridge may include a susceptor which may be heated by the induction heater.

The aerosol generating device 400 may include at least one sensor 430. A sensing result from the at least one sensor 430 may be transmitted to the controller 460, and the controller 460 may control the aerosol generating device 400 according to the sensing result to perform various functions such as controlling operation of the healer 420 (e.g., controlling a duty ratio or a duty cycle of pulse width modulation (PWM)), limiting smoking, detecting whether or not a cigarette (or a cartridge) is inserted, and displaying a notification. For example, the controller 460 may control generation of an aerosol on the basis of the sensing result from a puff sensor.

The at least one sensor 430 may include the puff sensor. The puff sensor may detect a puff of a user by using various parameters such as a temperature change, a flow change, a voltage change, a capacitance change, and a pressure change.

The puff sensor may detect a start time and an end time of the puff of the user, and the controller 460 may determine a puff period and a non-puff period according to the detected start time and end time of the puff.

The controller 460 may determine that a point in time at which a value (e.g., a pressure value, a temperature value, a voltage value, a capacitance value, or the like) detected by the puff sensor exceeds a preset first threshold value corresponds to the start time of the puff. Also, the controller 460 may detect that a point in time at which the value detected by the puff sensor becomes lower than a preset second threshold value corresponds to the end time of the puff. Here, the first threshold value and the second threshold value for detecting the start time and the end time of the puff may be set to the same or different random values of various parameters (e.g., pressure values, temperature values, voltage values, capacitance values, or the like) according to a use environment of the aerosol generating device 400.

Meanwhile, the at least one sensor 430 may include a temperature sensor. The temperature sensor may detect a temperature at which the heater 420 (or an aerosol generating material) is heated. The aerosol generating device 400 may include a separate temperature sensor for sensing a temperature of the heater 420, or the heater 420 itself may serve as a temperature sensor instead of including a separate temperature sensor. Alternatively, a separate temperature sensor may be further included in the aerosol generating device 400 while the heater 420 serves as a temperature sensor.

In addition, the at least one sensor 430 may include a position change detecting sensor. The position change detecting sensor may detect a change in a position of the slider coupled to the main body to move with respect to the main body.

The user interface 440 may provide the user with information about the state of the aerosol generating device 400. The user interface 440 may include various interfacing devices, such as a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and communication interfacing modules for performing wireless communication (for example, Wi-Fi, Wi-Fi direct, Bluetooth, near-field communication (NFC), etc.) with external devices.

However, the aerosol generating device 400 may be implemented by selecting only some of the above-described various interfacing devices.

The memory 450 may be a hardware component configured to store various pieces of data processed in the aerosol generating device 400, and the memory 450 may store data processed or to be processed by the controller 460. The memory 450 may include various types of memories, such as random access memory, such as dynamic random access memory (DRAM), static random access memory (SRAM), etc., read-only memory (ROM), electrically erasable programmable read-only memory (EEPROM), etc.

The memory 450 may store an operation time of the aerosol generating device 400, the maximum number of puffs, the current number of puffs, at least one temperature profile, at least one power supply profile, data on a user's smoking pattern, etc.

The controller 460 is a hardware component configured to control general operations of the aerosol generating device 400. The controller 460 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 460 analyzes a result of the sensing performed by at least one sensor 430, and controls processes that are to be performed subsequently.

The controller 460 may control power supplied to the heater 420 so that the operation of the heater 420 is started or terminated, based on the result of the sensing performed by the at least one sensor 430. In addition, based on the sensing result from the at least one sensor 430, the controller 460 may control the amount of power supplied to the heater 420 and the time at which the power is supplied, so that the heater 420 is heated to a predetermined temperature or maintained at an appropriate temperature.

In detail, the controller 460 may perform PWM control for supplying power from the battery 410 to the atomizer according to the start time and the end time of the puff, which are detected by the puff sensor of the sensor 430.

When a start time of a current puff is detected, the controller 460 may perform the PWM control at a first duty ratio such that the heater 420 of the atomizer is heated to a target temperature range for generating an aerosol until an end time of the current puff is detected.

The target temperature range may be an appropriate temperature range for vaporizing a liquid aerosol generating material into an aerosol. For example, the target temperature range may be about 200° C. to about 230° C., but is not limited thereto. When the resistance of the heater 420 is about 1.2Ω to about 1.8Ω, and a voltage of the battery 410 is about 3.8V to 4.35V, power of about 6 W to about 7 W may be supplied to the heater 420 to heat the heater 420 to the target temperature range of about 200° C. to about 230° C. Here, the controller 460 may perform PWM control according to a PWM duty ratio of about 80% to about 53% (hereinafter, a first duty ratio) so that the heater 420 is heated to the target temperature range of about 200° C. to about 230° C. The values described above are only examples for convenience of description, and thus may be adjusted by various factors such as characteristics of the heat 420 and an operation environment of the aerosol generating device 400.

When an end time of the current puff is detected, the controller 460 may perform the PWM control at a second duty ratio lower than the first duty ratio such that power is supplied to the heater 420 from the detected end time until a start time of a next puff is detected. Here, a first period for the PWM control at the first duty ratio may be longer than a second period for the PWM control at the second duty ratio, but embodiments are not limited thereto. In embodiment, the first period may be the same as or shorter than the second period.

As described above, the controller 460 may prevent an excessive decrease in a temperature of the heater 420 by performing the PWM control at the second duty ratio during a non-puff period between puff periods. For example, the controller 460 may perform the PWM control so that the temperature of the heater 420 does not decrease below a predetermined temperature range that is lower than the target temperature range. The predetermined temperature range may correspond to an appropriate temperature range in which a liquid aerosol generating material on a wick of the atomizer is not vaporized.

As the controller 460 may perform the PWM control at the second duty ratio during a non-puff period, activation of the heater 420 is maintained. Therefore, when a puff restarts, the heater 420 may be heated to the target temperature range within a short time. Accordingly, the aerosol generating device may generate a sufficient amount of aerosol in each puff period, thereby providing a satisfactory smoking sensation to a user. According to an existing method, power is not supplied to the heater 420 during a non-puff period. Therefore, when a next puff starts, a relatively longer time is taken to increase the temperature of the heater 420 to the target temperature range, and thus, a sufficient amount of aerosol is not provided during a puff period.

The controller 460 according to the present embodiment may set a second duty ratio and a second period such that a difference between an amount of aerosol generated during a current puff and an amount of aerosol to be generated during a next puff is within a predetermined range, and may perform PWM control during a non-puff period based on the second duty ratio.

In the present embodiment, for convenience of description, a PWM control parameter for generating an aerosol during a puff period may be referred to as being a first period and a first duty ratio, and a PWM control parameter for generating an aerosol during a non-puff period may be referred to as being a second period and a second duty ratio.

The controller 460 may control the user interface 440 on the basis of the sensing result from the at least one sensor 430. For example, when the number of puffs counted by a puff sensor reaches a preset number (i.e., a maximum number of puffs), the controller 460 may notify the user that the aerosol generating device 400 will end soon, by using at least one of a lamp, a motor, and a speaker.

Although not illustrated in FIG. 5, the aerosol generating device 400 and a separate cradle may form an aerosol generating system. For example, the cradle may be used to charge the battery 410 of the aerosol generating device 400. For example, the aerosol generating device 400 may be supplied with power from a battery of the cradle to charge the battery 410 of the aerosol generating device 400 while being accommodated in an accommodation space of the cradle.

Figure 6:
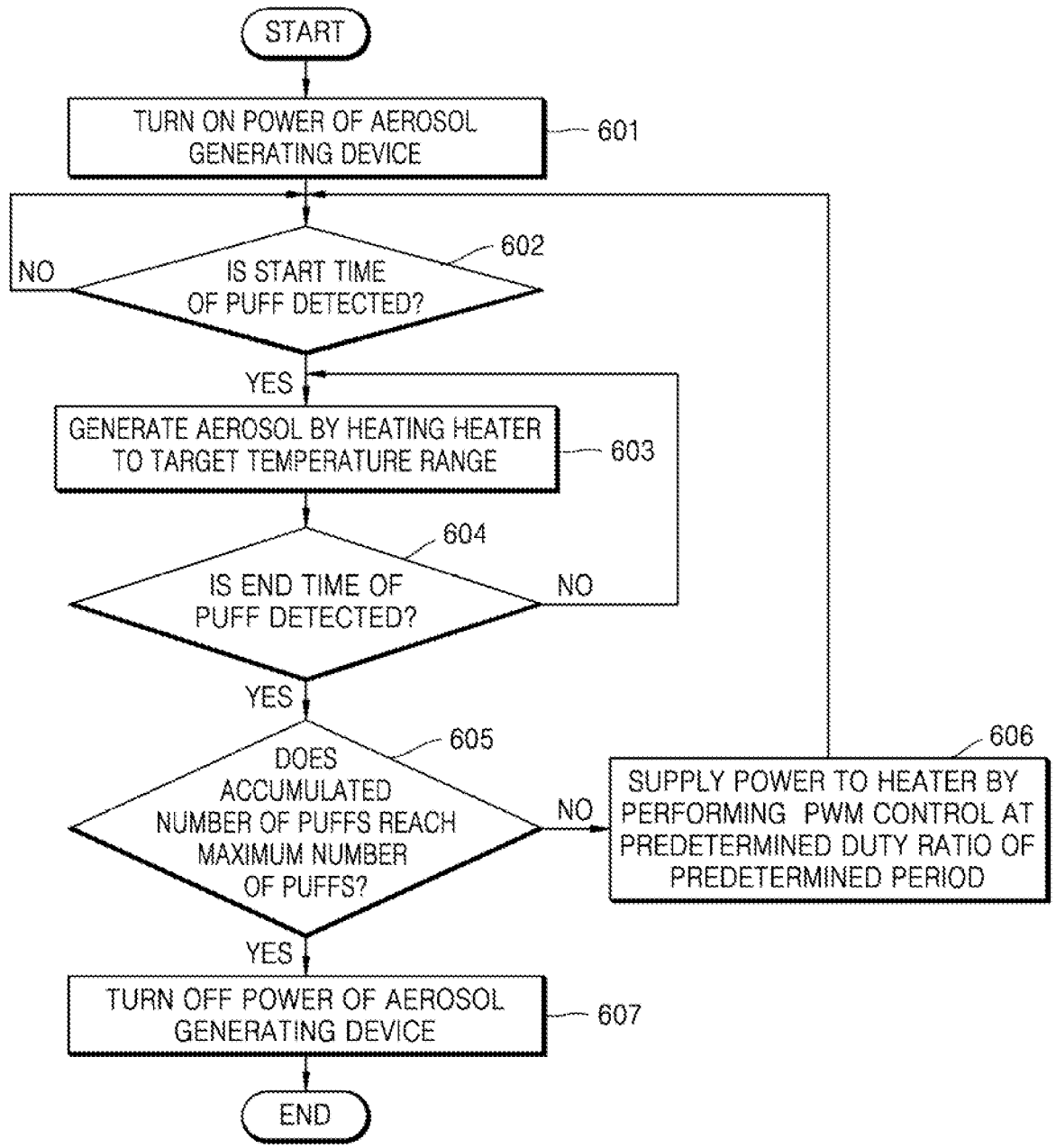
FIG. 6 is a flowchart illustrating a method of controlling a power supply to a heater during a puff period and a non-puff period in an aerosol generating device, according to one embodiment.

FIG. 6 is a flowchart illustrating a method of controlling power supply to a heater during a puff period and a non-puff period in an aerosol generating device, according to an embodiment.

Referring to FIG. 6, the method of controlling power supply to a heater includes operations that are processed in time series in the aerosol generating device 400 described above. Therefore, although the descriptions of the aerosol generating device 400 with reference to the drawings described above are omitted below, the descriptions may also be applied to the method of FIG. 6.

In operation 601, the aerosol generating device 400 enters a power-on state to start generation of an aerosol. The aerosol generating device 400 may be switched to the power-on state by a user manipulating the slider 7 of FIG. 1 or by detecting a user's puff through a puff sensing. In addition, when the aerosol generating device 400 includes a separate switch, button, or the like, the aerosol generating device 400 may be switched to the power-on state by the user manipulating the switch, button, or the like or by various types of other means supported by the aerosol generating device 400.

In operation 602, the controller 460 determines whether or not a start time of a puff is detected by the puff sensor of the sensor 430. The controller 460 may determine that a point in time at which a value (e.g., a pressure value, a temperature value, a voltage value, a capacitance value, or the like) detected according to a sensing method currently used in the puff sensor exceeds a preset first threshold value corresponds to the start time of the puff. When the controller 460 determines that the start time of the puff is detected by the puff sensor, the controller 460 enters operation 603. However, if the controller 460 determines that the start time of the puff is not detected, the controller 460 repeats operation 602 until the start time of the puff is detected by the puff sensor.

When the start time of the puff is detected, in operation 603, the controller 460 controls power supply to the heater 420 to heat the heater 420 to thereby generate an aerosol. In detail, the controller 460 may perform PWM control based on a first duty ratio and a first period such that the heater 420 is heated to a target temperature range. As described above, the target temperature range may be an appropriate temperature range for vaporizing a liquid aerosol generating material into an aerosol, and for example, may be a temperature range of about 200° C. to about 230° C. The user may inhale an aerosol, which is generated from the heater 420, through the mouthpiece 22 of FIG. 1 provided on the cartridge 20 of FIG. 1.

In operation 604, the controller 460 determines whether or not an end time of a current puff is detected by the puff sensor. The puff sensor may detect that a point in time at which a currently detected value becomes less than a preset second threshold value corresponds to the end time of the puff. When the controller 460 determines that the end time of the current puff is detected by the puff sensor, the controller 460 enters operation 605. However, when the controller 460 determines that the end time of the current puff is not detected, the controller 460 repeats operation 603 to continuously generate an aerosol during a current puff period.

As described above, a first threshold value and a second threshold value for detecting a start time and an end time of a puff, respectively, may be set to the same value or different values of various parameters (e.g., pressure values, temperature values, voltage values, capacitance values, or the like) according to a use environment.

In operation 605, the controller 460 determines whether or not an accumulated number of puffs reaches a maximum number of puffs. For example, one-time smoking may be set to be made of 14 consecutive puffs, and, in this case, the maximum number of puffs corresponds to 14 times. However, the maximum number of puffs may differ according to embodiments. When the user turns on power of the aerosol generating device 400 and performs 14 puffs accumulatively, the power of the aerosol generating device 400 may be turned off, and one-time smoking may be ended. Turning off of the power of the aerosol generating device 400 may refer to inactivation of the heater 420, end of PWM control, or the like.

When the accumulated number of puffs reaches the maximum number of puffs while the end time of the current puff is detected, the controller 460 turns off the power of the aerosol generating device 400 by performing operation 607. In other words, the PWM control is ended, and the heater 420 is inactivated.

However, when the controller 460 determines that the accumulated number of puffs does not reach the maximum number of puffs while the end time of the current puff is detected, the controller 460 performs operation 606 to perform the PWM control based on a second duty ratio and a second period during a non-puff period to thereby supply power to the heater 420. The controller 460 performs the PWM control of operation 606 until a start time of a next puff is detected.

The controller 460 is described as determining, in operation S605, power-off of the aerosol generating device 400 (i.e., end of the PWM control) on the basis of the accumulated number of puffs, but the present embodiment is not limited thereto. According to another embodiment, the controller 460 may turn off the aerosol generating device 400 (i.e., end the PWM control) on the basis of an accumulated use time. For example, when 4 minutes elapses after the power of the aerosol generating device 400 is turned on, the controller 460 may control the aerosol generating device 400 to be turned off (i.e., may control the heater 420 to be inactivated) and the PWM control to be ended.

In addition, operation 605 in FIG. 6 is described as being performed after operation 604, but the present embodiment is not limited thereto. According to another embodiment, operation 605 in FIG. 6 may be performed in a different order, such as before operation 604 or before operation 603.

Figure 7:
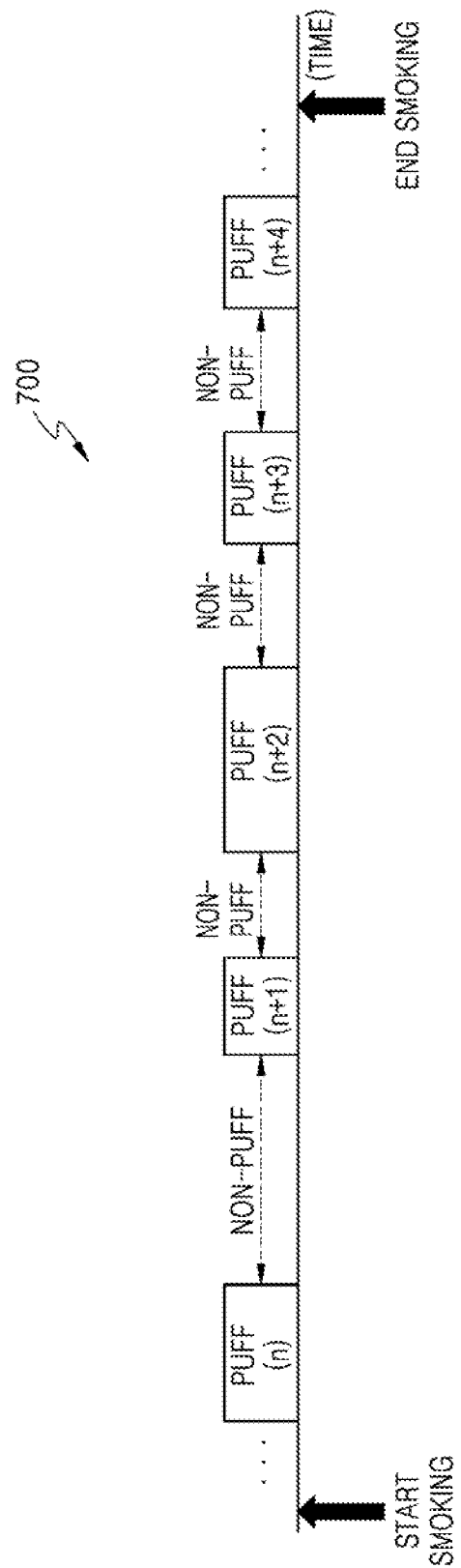
FIG. 7 is a view illustrating a puff pattern of a user according to one embodiment.

FIG. 7 is a view illustrating a puff pattern of a user, according to one embodiment.

Referring to FIG. 7, after a user starts smoking, the user may perform puffs less than or equal to a preset maximum number of puffs (e.g., 14 times). Alternatively, the user may perform puffs within a preset maximum use time (e.g., four minutes).

In a puff pattern 700 illustrated as an example, a width of a block corresponding to each puff represents a relative length of a puff period, and spacing between two blocks corresponding to two puffs represents a relative length of a non-puff period.

According to the puff pattern 700, puff periods of an $n^{th}$ puff, . . . , and an $n+4^{th}$ puff may be different from one another, and non-puff periods may also be different from one another. Here, a degree of a decrease in a temperature of the heater 420 in the non-puff periods may vary according to a length of a non-puff period.

Figure 8:
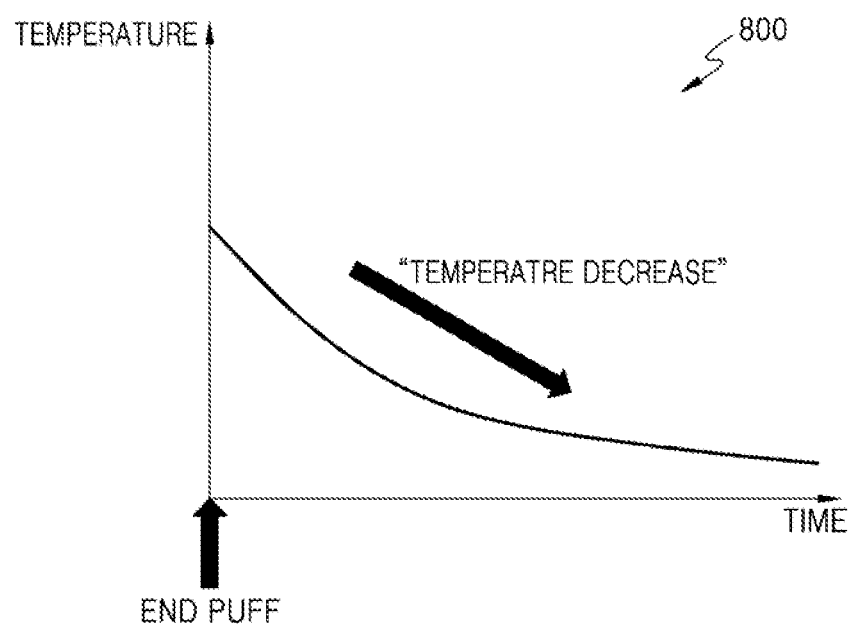
FIG. 8 is a graph illustrating a decrease in temperature when power supply to a heater is stopped during a non-puff period.

FIG. 8 is a graph illustrating a decrease in temperature when power supply to a heater is stopped during a non-puff period. Referring to a graph 800 of FIG. 8, when power supply to the heater 420 is stopped as PWM control by the controller 460 is stopped during a non-puff period (i.e., between the end of the puff and the start of the next puff), a temperature of the heater 420 gradually decreases over time. Therefore, when the next puff starts after the non-puff period, it takes some time to increase, to a target temperature range, the temperature of the heater 420 which has decreased during the non-puff period.

Referring to FIG. 7 again, when the non-puff period (e.g., a period between the $n^{th}$ puff and an $n+1^{th}$ puff) is relatively long, assuming that power supply is stopped during a relatively longer time, the temperature of the heater 420 may decrease more, and thus, when the next puff (e.g., the $n+1^{th}$ puff) starts, it takes longer to increase the temperature of the heater 420 to the target temperature range. In this case, if a puff period of the next puff (e.g., the $n+1^{th}$ puff) is relatively short, a sufficient amount of aerosol may not be generated during the puff period of the next puff (e.g., the n+1$^{th}$ puff). Accordingly, a user may not be provided with a uniform smoking sensation in each puff.

However, as described in operation 606 of FIG. 6, when an end time of a current puff (e.g., the n$^{th}$ puff) is detected, the controller 460 of the aerosol generating device 400 according to the present embodiment may perform PWM control so that power is supplied to the heater 420 based on a second duty ratio and a second period between the detected end time and a start time of a next puff (e.g., the n+1$^{th}$ puff). As a result, the temperature of the heater 420 may be maintained within a predetermined temperature range due to the supplied power, and the heater 420 may be heated to a target temperature range faster than when the next puff (e.g., the n+1$^{th}$ puff) starts. Therefore, an amount of aerosol may not be significantly reduced.

Figure 9:
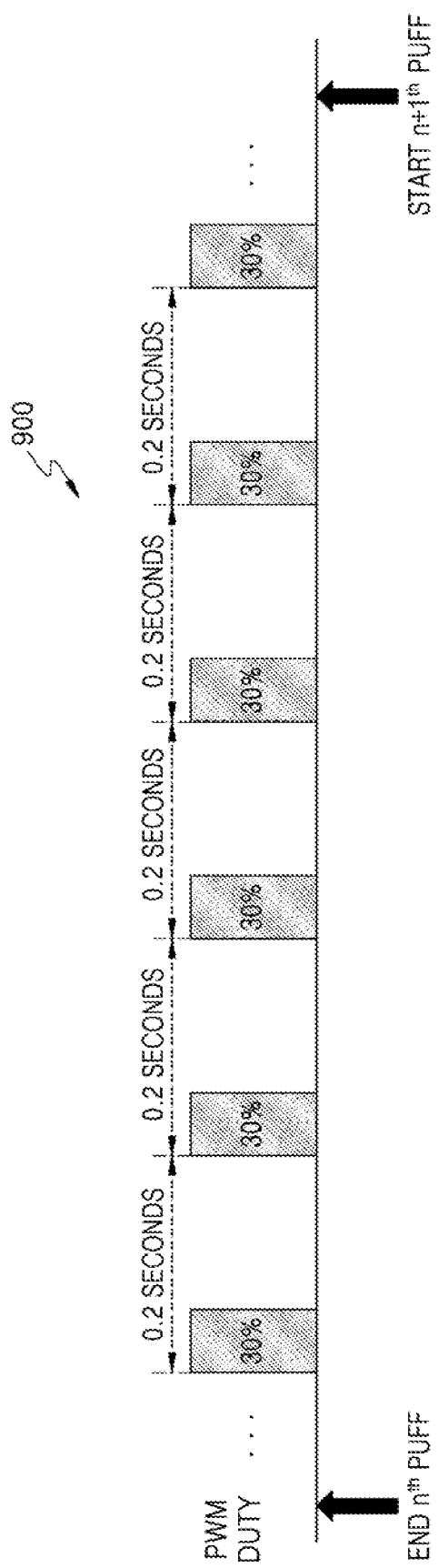
FIG. 9 is a view illustrating PWM control in a non-puff period, according to one embodiment.

FIG. 9 is a view illustrating PWM control in a non-puff period, according to one embodiment.

Referring to FIG. 9, when an end time of a current puff (e.g., an n$^{th}$ puff) is detected, the controller 460 performs PWM control 900 so that power is supplied to the heater 420 at a second duty ratio for each second period between the detected end time and a start time of a next puff (e.g., an n+1$^{th}$ puff).

As illustrated in FIG. 9, the controller 460 may perform the PWM control 900 during a non-puff period based on the second period of 0.2 seconds and the second duty ratio of 30%. However, embodiments are not limited thereto, and the second period and the second duty ratio may be changed to various values.

It is preferable that the heater 420 generates little aerosol during the non-puff period, and thus, a temperature of the heater 420 may be maintained within a predetermined temperature range which is lower than a target temperature range for generating an aerosol and in which a liquid aerosol generating material is not vaporized. The controller 460 performs the PWM control 900 for the heater 420 based on the second duty ratio and the second period to prevent the temperature of the heater 420 from decreasing below the predetermined temperature range.

The temperature of the heater 420 during the non-puff period stays at a temperature lower than the target temperature range for generating an aerosol, and thus, the second duty ratio (e.g., about 30%) for the PWM control 900 during the non-puff may be lower than a first duty ratio (e.g., about 80% to about 53%) of PWM control for heating the heater 420 to the target temperature range.

Also, the second period (e.g., 0.2 seconds) for the PWM control during the non-puff period may be shorter than a first period for the PWM control during the puff-period. However, embodiments are not limited thereto, and the first period may be the same as or shorter than the second period.

The PWM control 900 of FIG. 9 is described as having the same period and duty ratio during the non-puff period, but embodiments are not limited thereto. In other words, according to another embodiment, a period or a duty ratio for the PWM control 900 may vary during a non-puff period. For example, when a predetermined time elapses from an end time of a previous puff during a non-puff period, the controller 460 may increase or decrease a period for the PWM control. Also, the controller 460 may control different duty ratios (e.g., 25% and 35%) to be alternately repeated or may decrease a duty ratio after a predetermined time elapses. In other words, the second period and the second duty ratio for the PWM control 900 during the non-puff period may be variously changed or configured.

In addition, the controller 460 may adaptively change and determine the second period or the second duty ratio for the PWM control 900 on the basis of a level of a current remaining battery capacity of the battery 410. When the PWM control 900 is performed during a non-puff period, power is continuously supplied from the battery 410, and thus, power of the battery 410 may be consumed more than when the PWM control 900 is not performed during the non-puff period. Therefore, the controller 460 may check the current remaining capacity of the battery 410, adaptively determine a second period and a second duty ratio based on the remaining battery capacity, and perform the PWM control 900 during the non-puff period at the determined second period and second duty ratio.

When the non-puff period lasts too long, continuously performing the PWM control 900 may be inefficient in terms of power management of the battery 410. Accordingly, when the predetermined time elapses after the end time of the current puff is detected without detecting the start time of the next puff, the controller 460 may end the PWM control 900.

Figure 10:
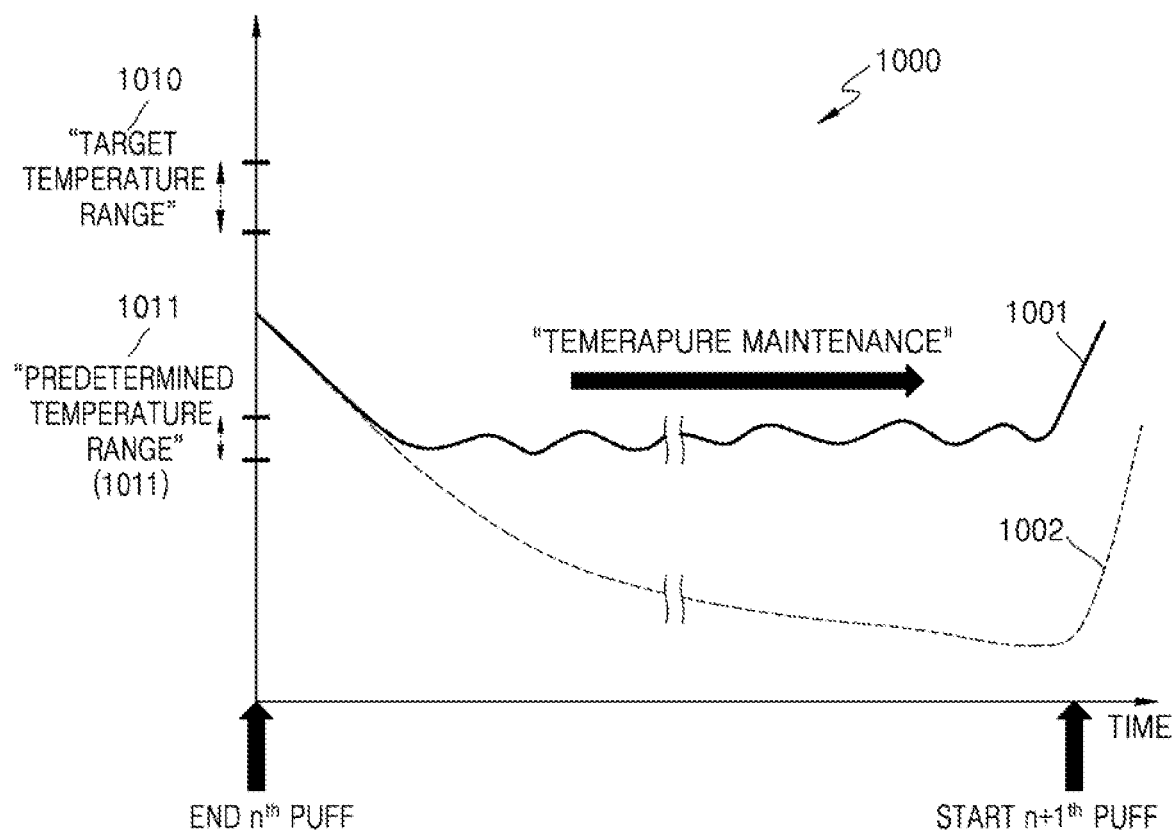
FIG. 10 is a graph illustrating a comparison of changes in temperature of a heater between a case where PWM control is performed during a non-puff period and a case where PWM control is not performed during a non-puff period, according to one embodiment.

FIG. 10 is a graph illustrating a comparison of changes in temperature of a heater between a case where PWM control is performed during a non-puff period and a case where the PWM control is not performed during the non-puff period, according to one embodiment.

Referring to a graph 1000 of FIG. 10, in a case 1002 where PWM control is not performed during a non-puff period, power is not supplied after a puff ends, and thus a temperature of the heater 420 continuously decreases. The case 1002 shows a similar trend to the graph 800 of FIG. 8.

However, unlike the case 1002, in a case 1001 where PWM control is performed during a non-puff period according to an embodiment, the PWM control is performed at a second duty ratio of a second period from an end time of a puff. Thus, the temperature of the heater 420 may be maintained within a predetermined temperature range 1011. The predetermined temperature range 1011 may correspond to a range lower than a target temperature range 1010 for generating an aerosol.

When a start time of a next puff (e.g., an n+1$^{th}$ puff) is detected, the controller 460 supplies power to the heater 420 to increase the temperature of the heater 420 to the target temperature range 1010. At this point, according to the case 1002 where the PWM control is not performed during the non-puff period, the temperature of the heater 420 is relatively low. Therefore, a relatively long time may be taken to increase the temperature of the heater 420 to the target temperature range 1010. However, according to the case 1001 where the PWM control is performed during the non-puff period, the temperature of the heater 420 has decreased relatively less than the case 1002. Therefore, a relatively short time may be taken to increase the temperature of the heater 420 to the target temperature range 1010, thereby generating a uniform amount of aerosol in each puff period.

Figure 11:
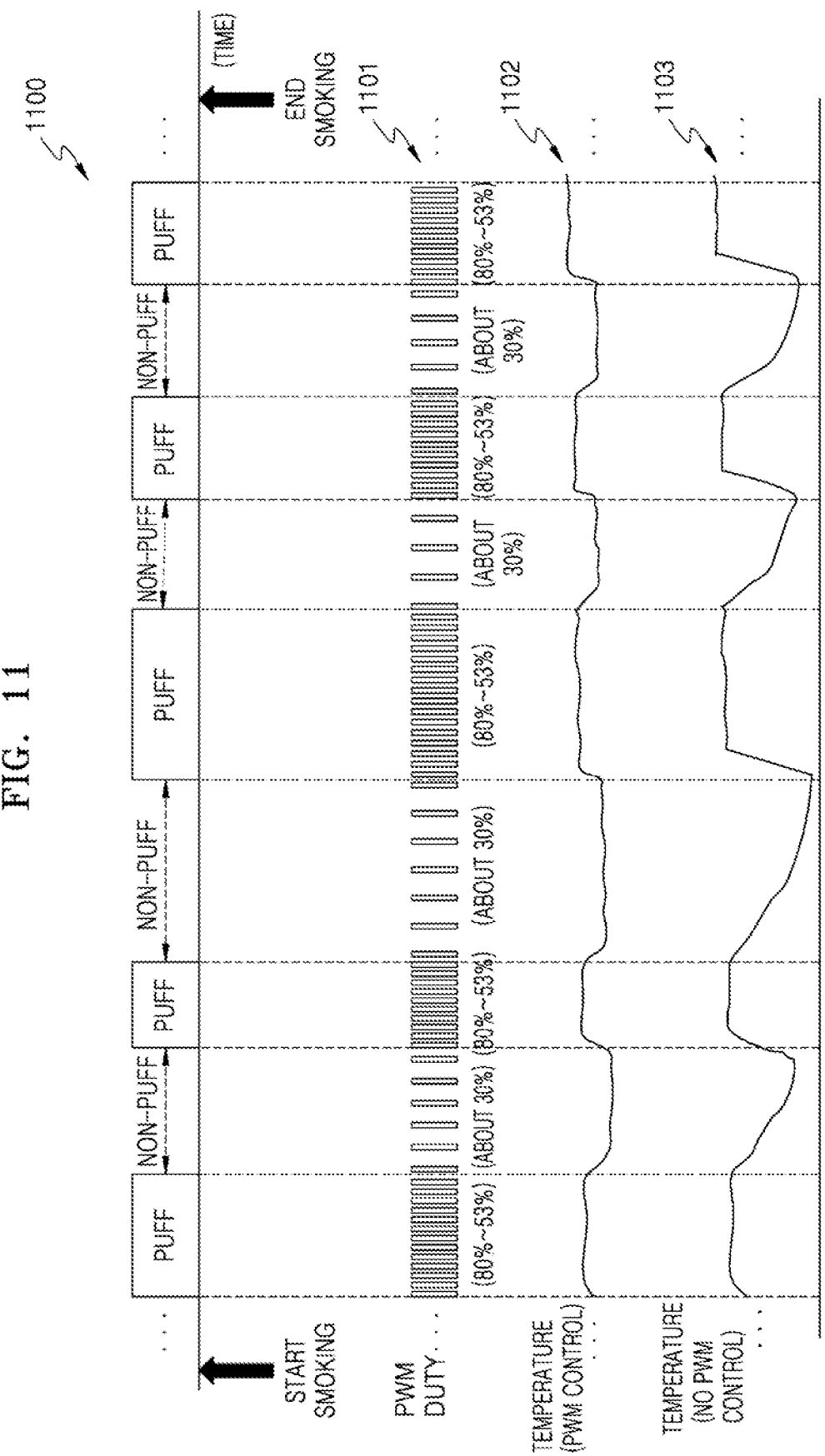
FIG. 11 is a view illustrating temperature control of a heater through PWM control during a puff period and a non-puff period, according to one embodiment.

FIG. 11 is a view illustrating temperature control of a heater through PWM control during a puff period and a non-puff period, according to one embodiment.

FIG. 11 illustrates a puff pattern 1100 of a user during a one-time smoking. Also, FIG. 11 illustrates a PWM duty change 1101 and a heater temperature change 1102 corresponding to the puff periods and non-puff periods in the puff pattern 1100.

The controller 460 sets a PWM duty ratio to about 80% to about 53% to supply power to the heater 420 to thereby generate an aerosol by heating the heater 420 to a target temperature range for each puff period included in the puff pattern 1100. According to such PWM control, the temperature of the heater 420 increases to the target temperature range, and an aerosol is generated.

When an end time of a puff is detected by a puff sensor, the controller 460 may changes the PWM duty ratio. Here, for example, the PWM duty ratio (a second duty ratio) during a non-puff period may be about 30%, and a PWM period (a second period) may be 0.2 seconds. However, embodiments are not limited thereto.

According to such PWM control in a non-puff period, the temperature of the heater 420 may slightly decrease but may be maintained within a predetermined temperature range. On the contrary, when the PWM control is not performed during a non-puff period as in a heater temperature change 1103, the temperature of the heater 420 may continuously decrease during the non-puff period. As a result, as shown in FIG. 11, the heater temperature change 1103 is different from the heater temperature change 1102. In other words, when the temperature of the heater 420 is maintained within the predetermined temperature range by PWM control according to a predetermined PWM duty ratio (the second duty ratio) and a predetermined PWM period (the second period), the heater 420 may be heated to the target temperature range fast when a next puff starts. As a result, a uniform amount of aerosol may be generated in each puff, and a user may have a satisfactory smoking sensation.

According to the present embodiment, as illustrated in FIG. 11, the lengths of the puff periods are different from one another, the temperature of the heater 420 during a non-puff period may be maintained within a predetermined temperature range through PWM control, and thus, a uniform amount of aerosol may be secured for each puff.

Figure 12:
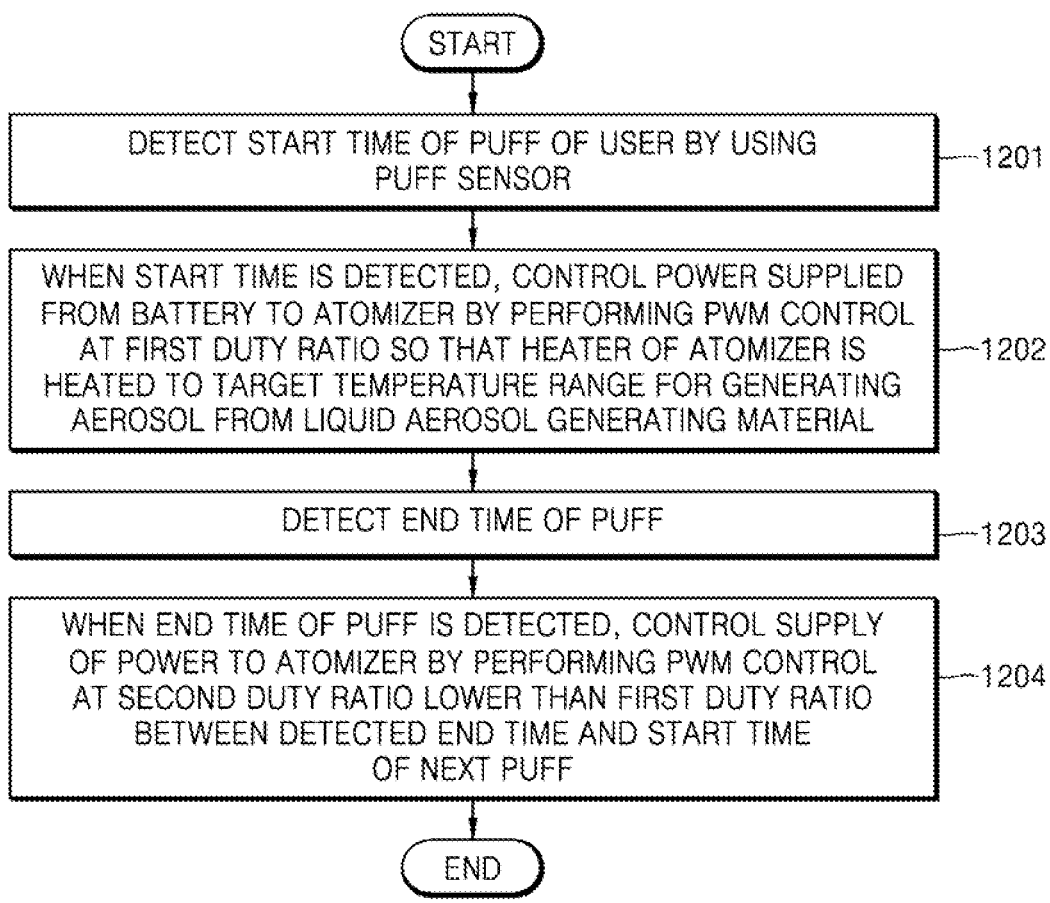
FIG. 12 is a flowchart of a method of controlling power supply to a heater according to detection of a puff time in an aerosol generating device, according to one embodiment.

FIG. 12 is a flowchart illustrating a method of controlling power supply to a heater according to detection of a puff time in an aerosol generating device, according to one embodiment.

Referring to FIG. 12, the method of controlling power supply to a heater includes operations that are processed in time series in the aerosol generating device 400 described above. Therefore, although the descriptions of the aerosol generating device 400 with reference to the drawings described above are omitted below, the descriptions may also be applied to the method of FIG. 12.

In operation 1201, the controller 460 detects a start time of a puff of a user by using a puff sensor.

When the start time of the puff is detected, in operation 1202, the controller 460 controls power supplied from the battery 410 to the atomizer by performing PWM control at a first duty ratio so that the heater 420 of the atomizer is heated to a target temperature range for generating an aerosol from a liquid aerosol generating material.

In operation 1203, the controller 460 detects an end time of the puff by using the puff sensor.

When the end time of the puff is detected, in operation 1204, the controller 460 controls power supply to the atomizer by performing the PWM control at a second duty ratio lower than the first duty ratio between the detected end time and a start time of a next puff.

The above-described method may be written as a program executable in a computer and may be implemented in a general-purpose digital computer that operates the program by using a non-transitory computer-readable recording medium. In addition, a structure of data used in the above-described method may be recorded on the nontransitory computer-readable recording medium via various types of elements. The non-transitory computer-readable recording medium includes storage media such as a magnetic storage medium (e.g., ROM, RAM, a USB, a floppy disk, a hard disk, or the like) and optical reading medium (e.g., CD-ROM, DVD, or the like).

At least one of the components, elements, modules or units (collectively "components" in this paragraph) represented by a block in the drawings, such as the controller 460, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details may be made therein without departing from the scope of the characteristics described above. The disclosed methods should be considered in a descriptive sense only and not for purposes of limitation. The scope of the disclosure should be defined by the appended claims not by the above description, and all differences within the scope equivalent to those described in the claims will be construed as being included in the disclosure.

The invention claimed is:

1. An aerosol generating device comprising:
 a cartridge including a liquid storage configured to store a liquid aerosol generating material, and an atomizer configured to generate an aerosol by heating the liquid aerosol generating material; and
 a main body detachably coupled to the cartridge, and including:
   a battery configured to supply power to the atomizer;
   a puff sensor configured to detect a start time and an end time of a puff of a user; and
   a controller configured to:
 perform a pulse width modulation (PWM) control at a first duty ratio between a start time and an end time of a current puff such that a heater of the atomizer is heated to a target temperature range for generating the aerosol, and
 perform the PWM control at a second duty ratio lower than the first duty ratio between the end time of the current puff and a start time of a next puff, wherein a first period for the PWM control at the first duty ratio is longer than a second period for the PWM control at the second duty ratio.

2. The aerosol generating device of claim 1, wherein the controller is configured to perform the PWM control at the second duty ratio such that a temperature of the heater is maintained within a predetermined temperature range, which is lower than the target temperature range.

3. The aerosol generating device of claim 2, wherein the atomizer includes a wick surrounded by the heater and configured to absorb and transfer the liquid aerosol generating material, and the liquid aerosol generating material absorbed in the wick is not vaporized while the heater is in the predetermined temperature range.

4. The aerosol generating device of claim 1, wherein the controller is configured to set the second duty ratio such that a difference between an amount of aerosol generated during the current puff and an amount of aerosol generated during the next puff is within a predetermined range.

5. The aerosol generating device of claim 1, wherein the controller is configured to end the PWM control at the second duty ratio based on an accumulated number of puffs reaching a predetermined maximum number of puffs.

6. The aerosol generating device of claim 1, wherein the controller is configured to end the PWM control at the second duty ratio when a predetermined time has elapsed before the start time of the next puff.

7. The aerosol generating device of claim 1, wherein the second duty ratio is 30%.

8. An aerosol generating device comprising:
   an atomizer configured to heat a liquid aerosol generating material;
   a battery configured to supply power to the atomizer;
   a puff sensor configured to detect a start time and an end time of a puff of a user; and
   a controller configured to control power supplied to the atomizer by performing pulse width modulation (PWM) control during a puff period and a non-puff period, the PWM being based on the start time and the end time of the puff such that a temperature of a heater of the atomizer is maintained within a predetermined temperature range, which is lower than a target temperature range for generating an aerosol, during the non-puff period between puff periods,
   wherein a first period for the PWM control between a start time and an end time of a current puff is longer than a second period for the PWM control between the end time of the current puff and a start time of a next puff.

9. The aerosol generating device of claim 8, wherein the controller is configured to:
   perform the PWM control at a first duty ratio between the start time and the end time of a current puff such that the heater of the atomizer is heated to the target temperature range; and
   perform the PWM control at a second duty ratio between the end time of the current puff and the start time of a next puff.

10. A method for controlling an aerosol generating device, comprising:
   detecting a start time of a puff of a user by using a puff sensor;
   after the detected start time, controlling power supplied from a battery to a atomizer by performing pulse width modulation (PWM) control at a first duty ratio such that a heater of the atomizer is heated to a target temperature range for generating an aerosol from a liquid aerosol generating material;
   detecting an end time of the puff; and
   after the detected end time, controlling power supplied to the atomizer by performing the PWM control at a second duty ratio lower than the first duty ratio until a start time of a next puff is detected,
   wherein a first period for the PWM control at the first duty ratio is longer than a second period for the PWM control at the second duty ratio.

11. The method of claim 10, wherein the PWM control at the second duty ratio maintains a temperature of the heater within a predetermined temperature range, which is lower than the target temperature range, during a non-puff period between puff periods.

12. The aerosol generating device of claim 1, wherein the controller is configured to adaptively change the second duty ratio based on a remaining capacity of the battery.

* * * * *